June 28, 1960 F. E. CHESHIRE 2,942,561
UNIT LOAD FREIGHT CAR
Filed Nov. 1, 1956 12 Sheets-Sheet 4
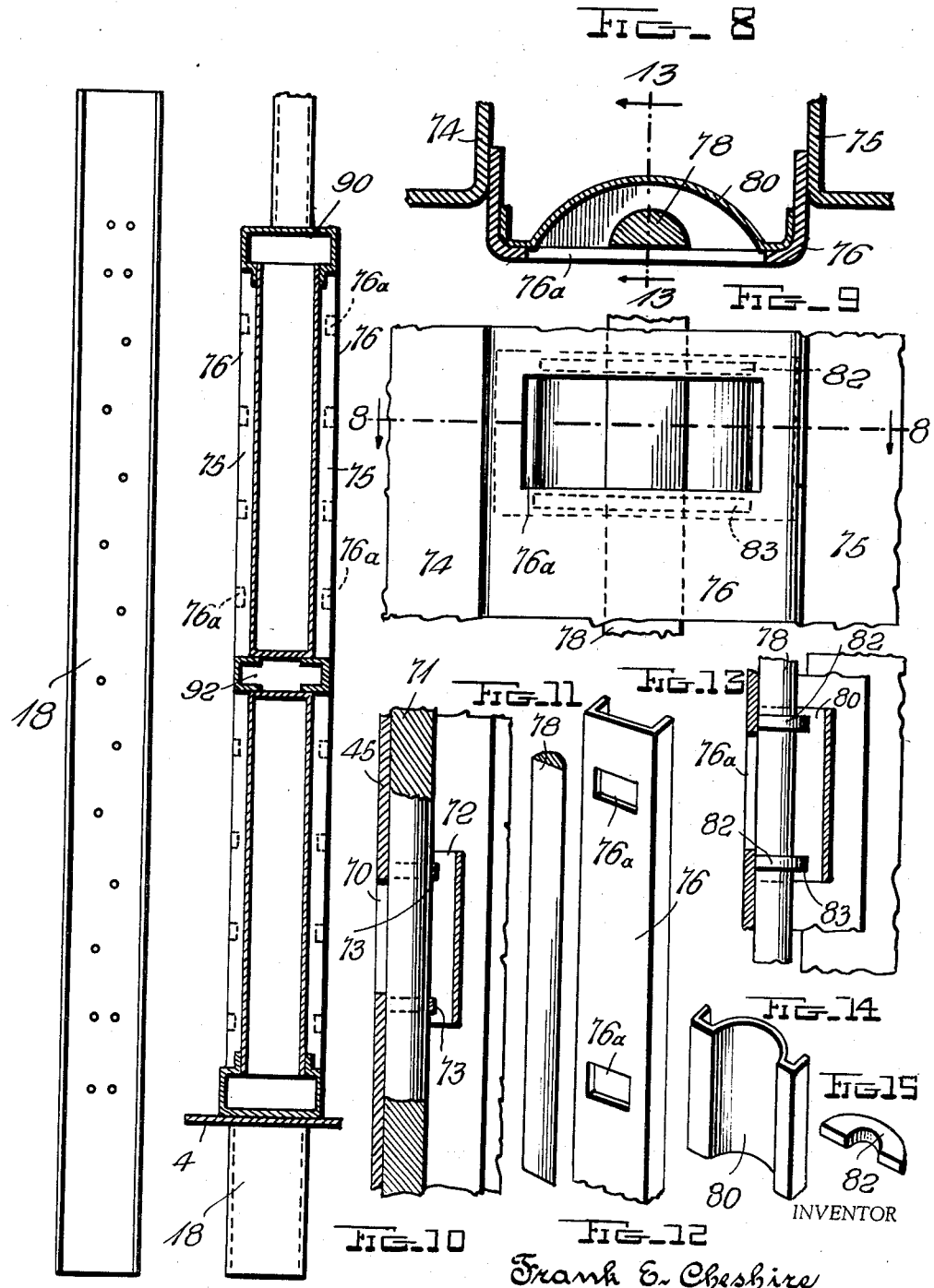
INVENTOR
Frank E. Cheshire,
BY John B. Brady
ATTORNEY

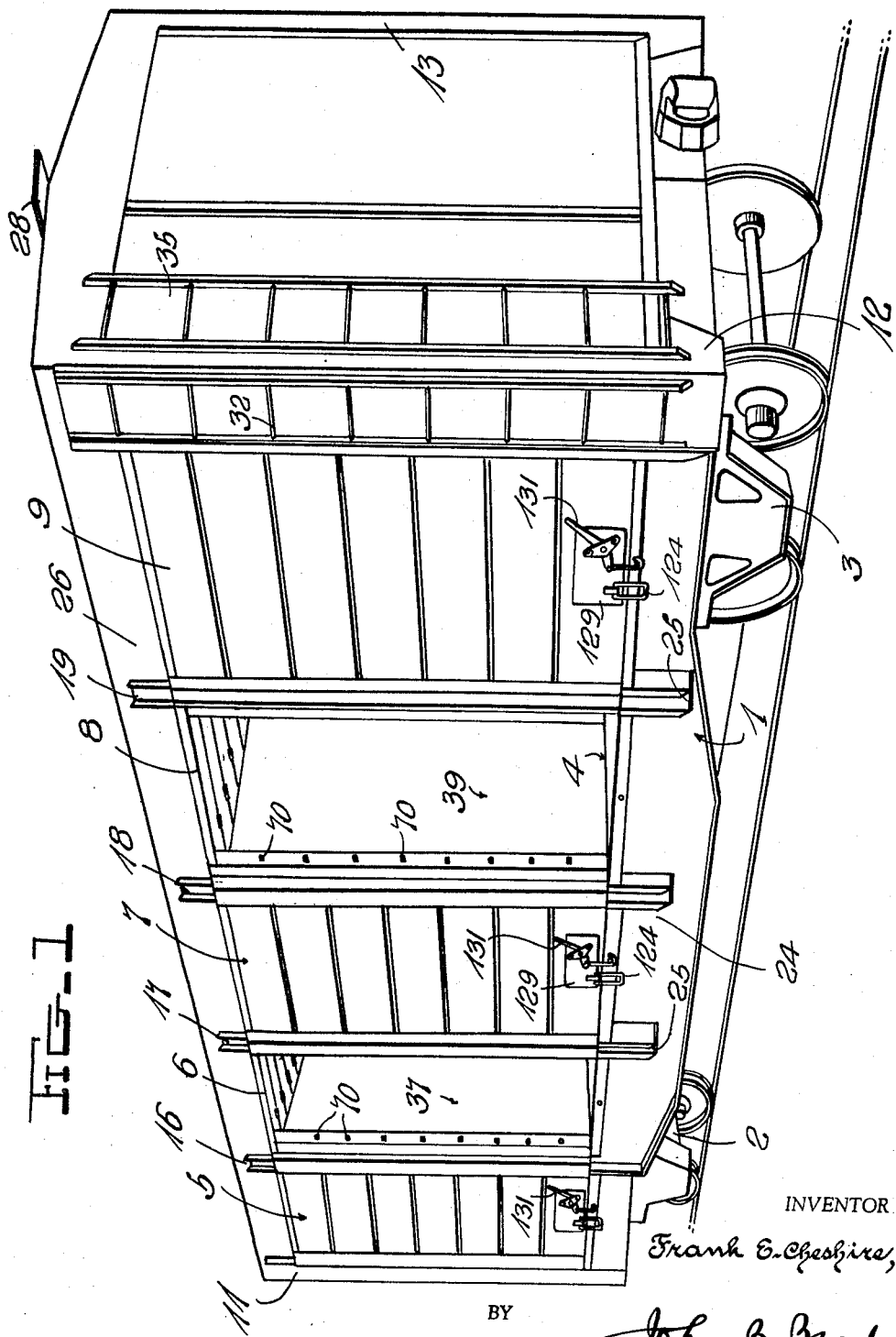

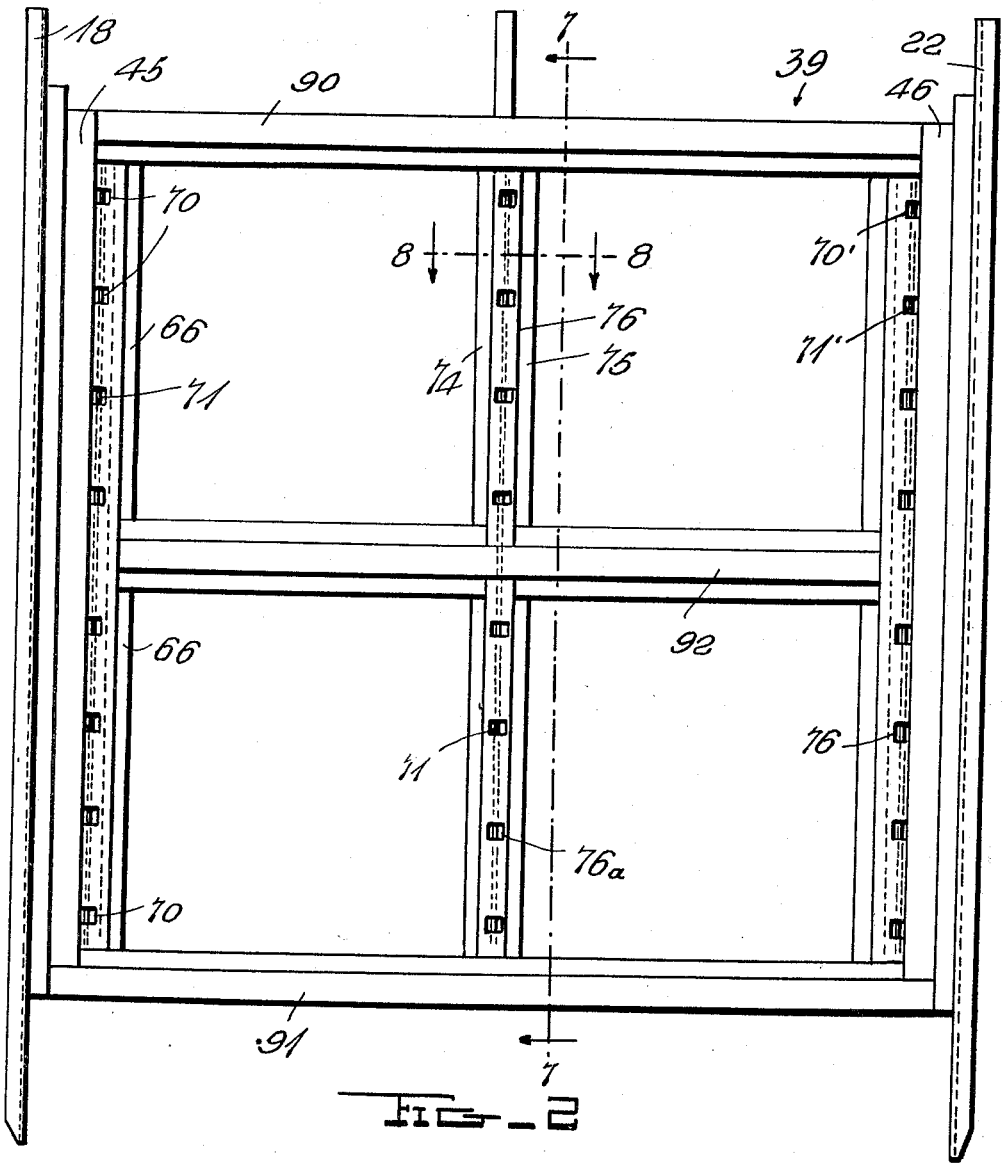

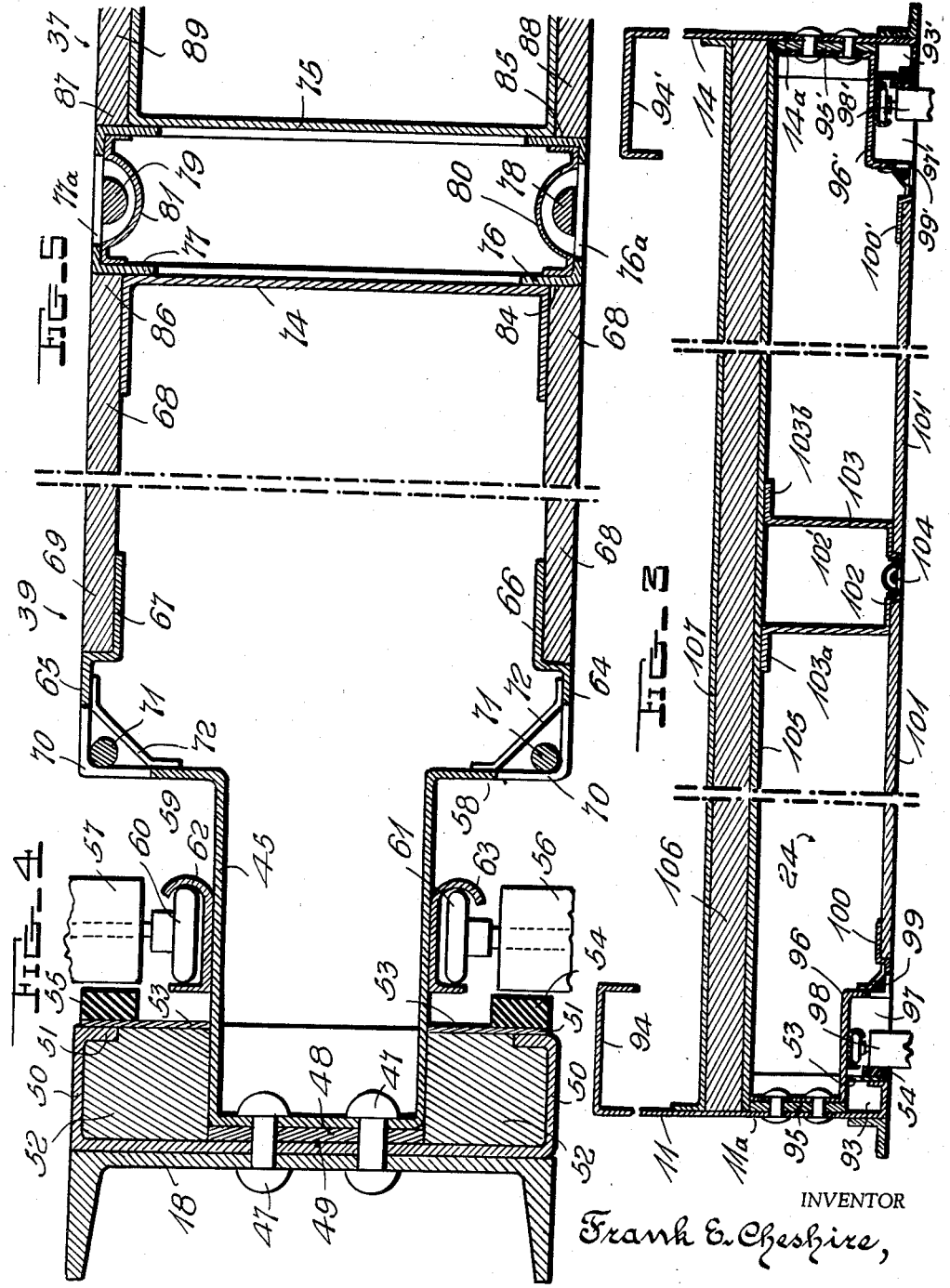

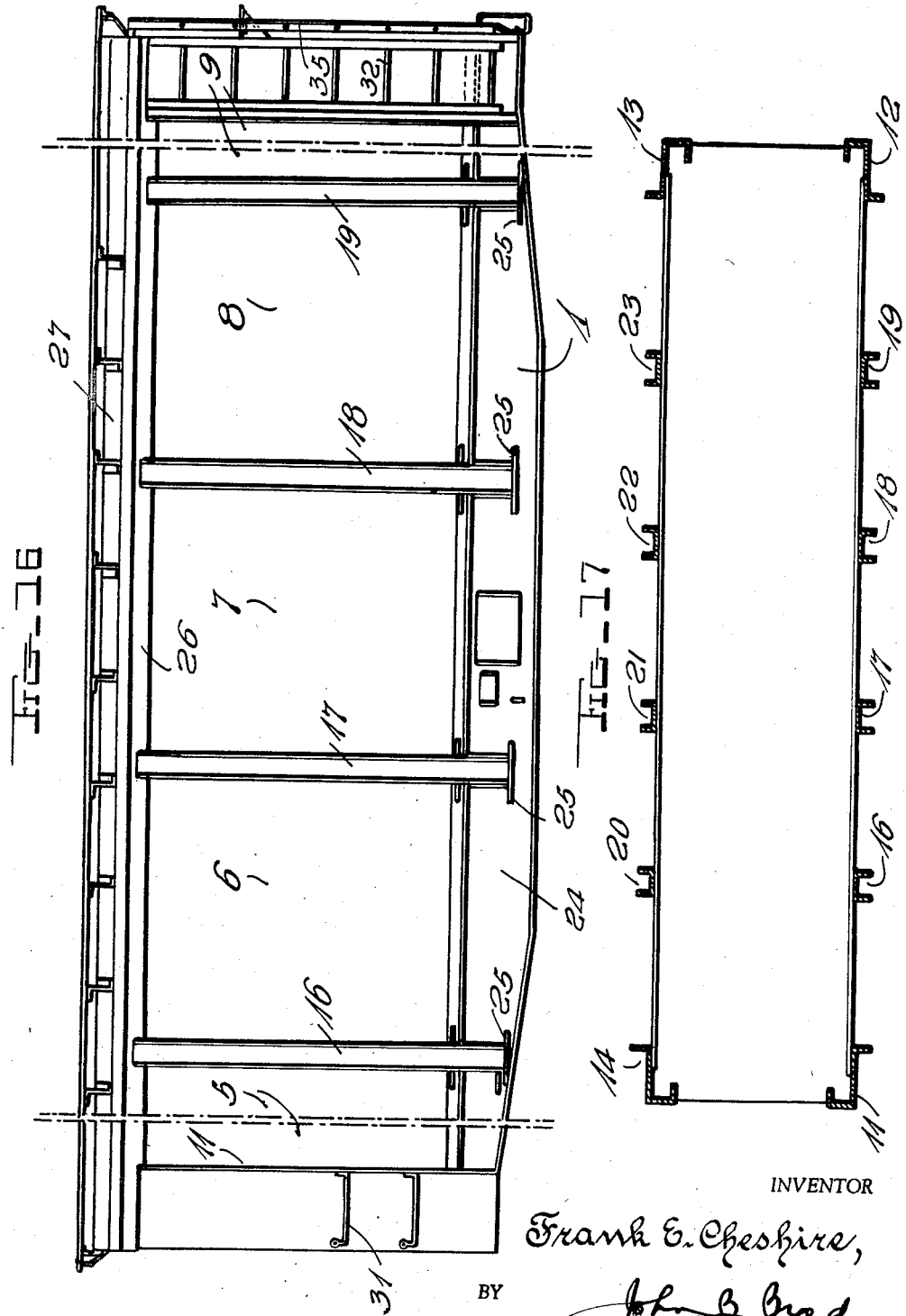

June 28, 1960  F. E. CHESHIRE  2,942,561
UNIT LOAD FREIGHT CAR
Filed Nov. 1, 1956  12 Sheets-Sheet 6
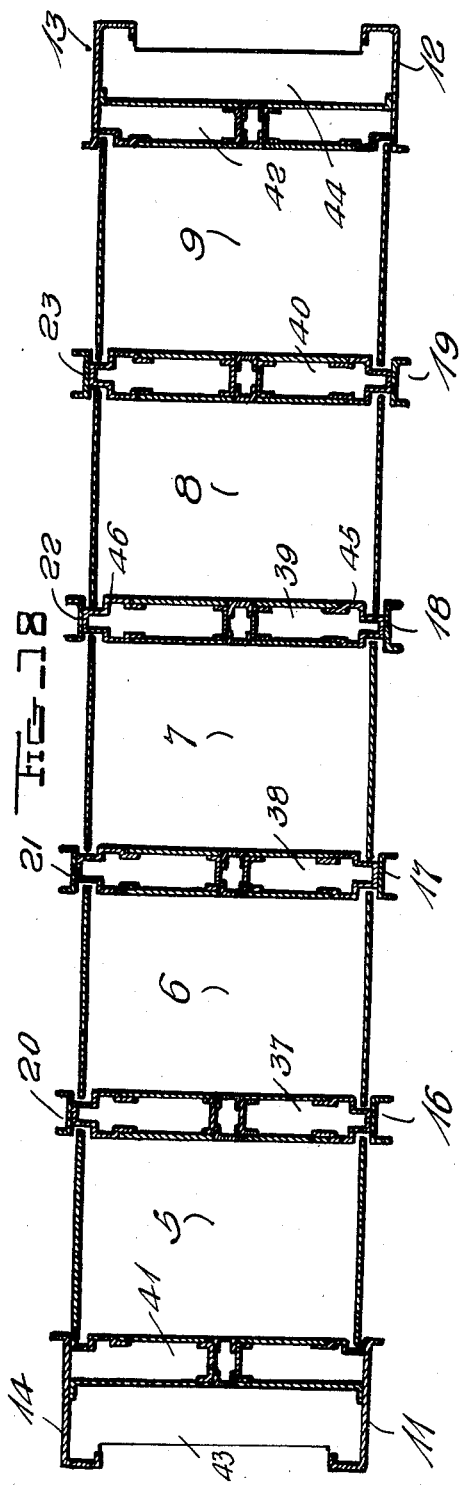
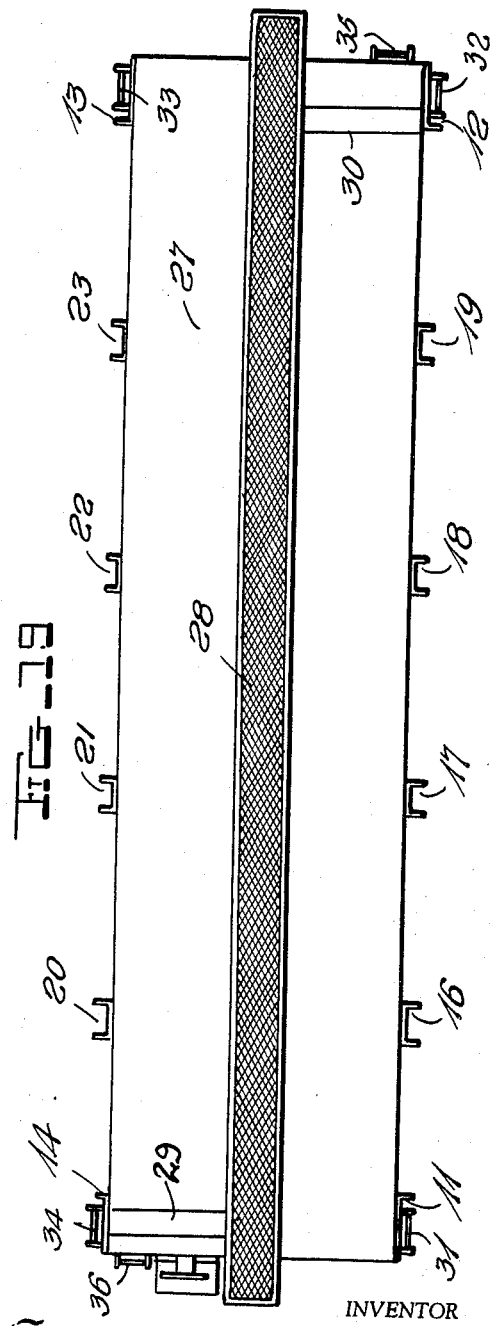
INVENTOR
Frank E. Cheshire,
BY
John B. Brady
ATTORNEY June 28, 1960 F. E. CHESHIRE 2,942,561
UNIT LOAD FREIGHT CAR
Filed Nov. 1, 1956 12 Sheets-Sheet 7
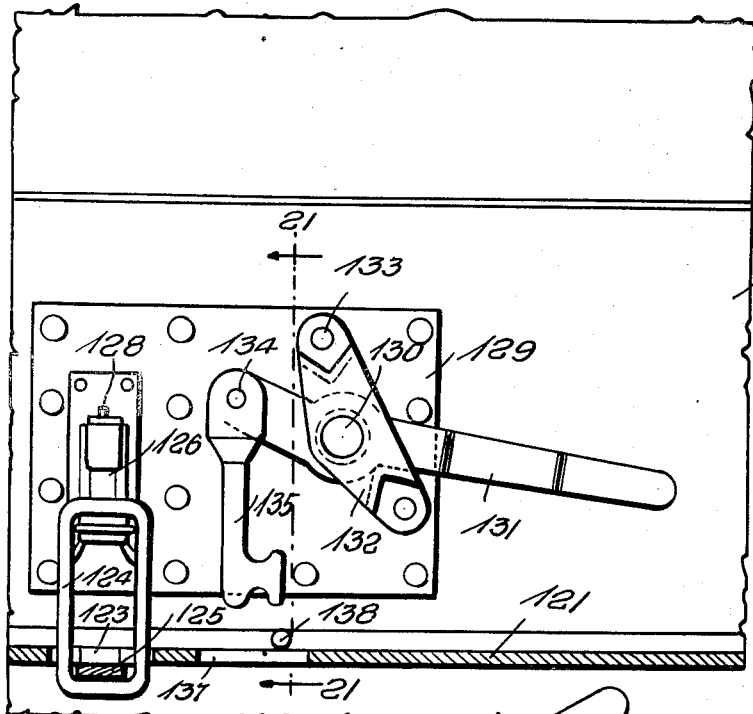
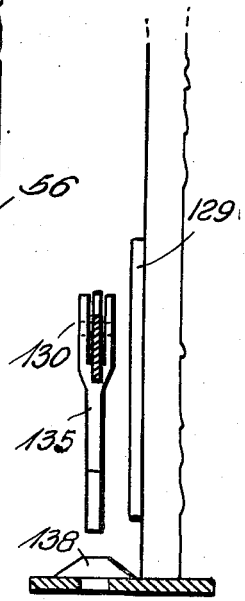
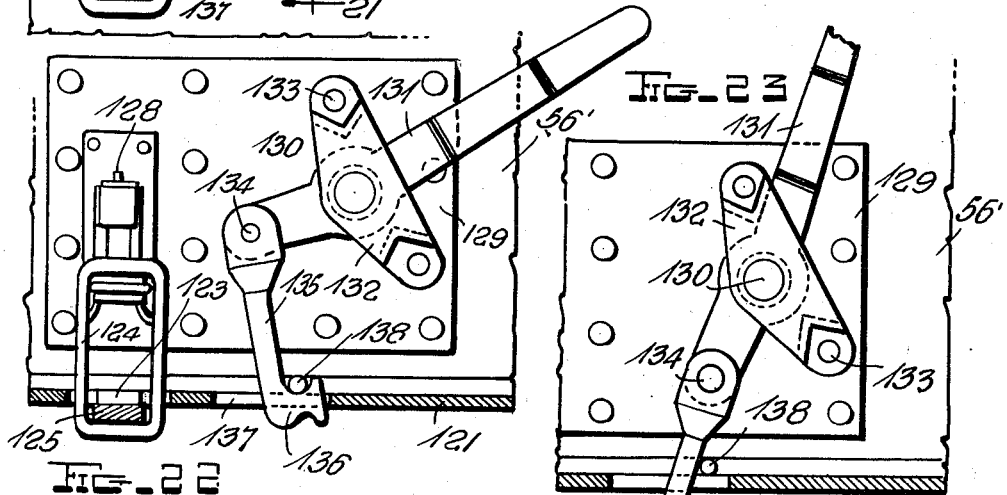
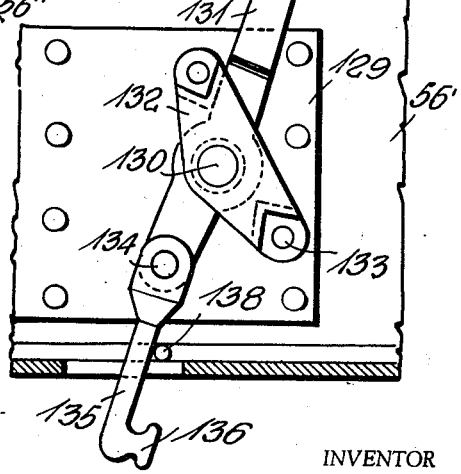
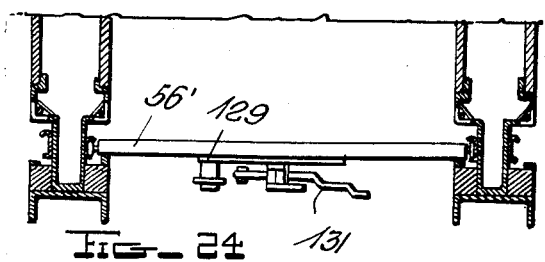
INVENTOR
Frank E. Cheshire,
BY
John B. Brady
ATTORNEY

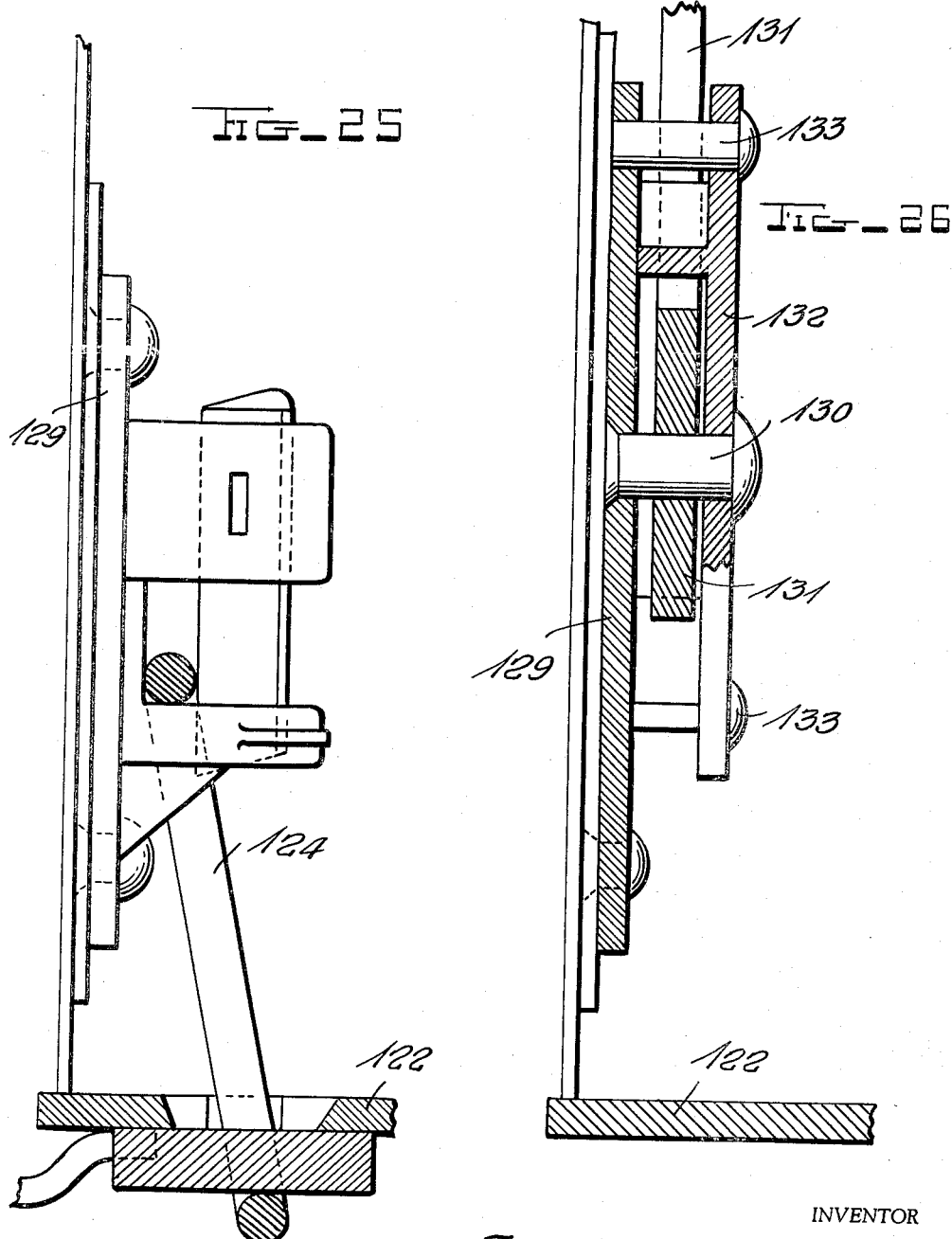

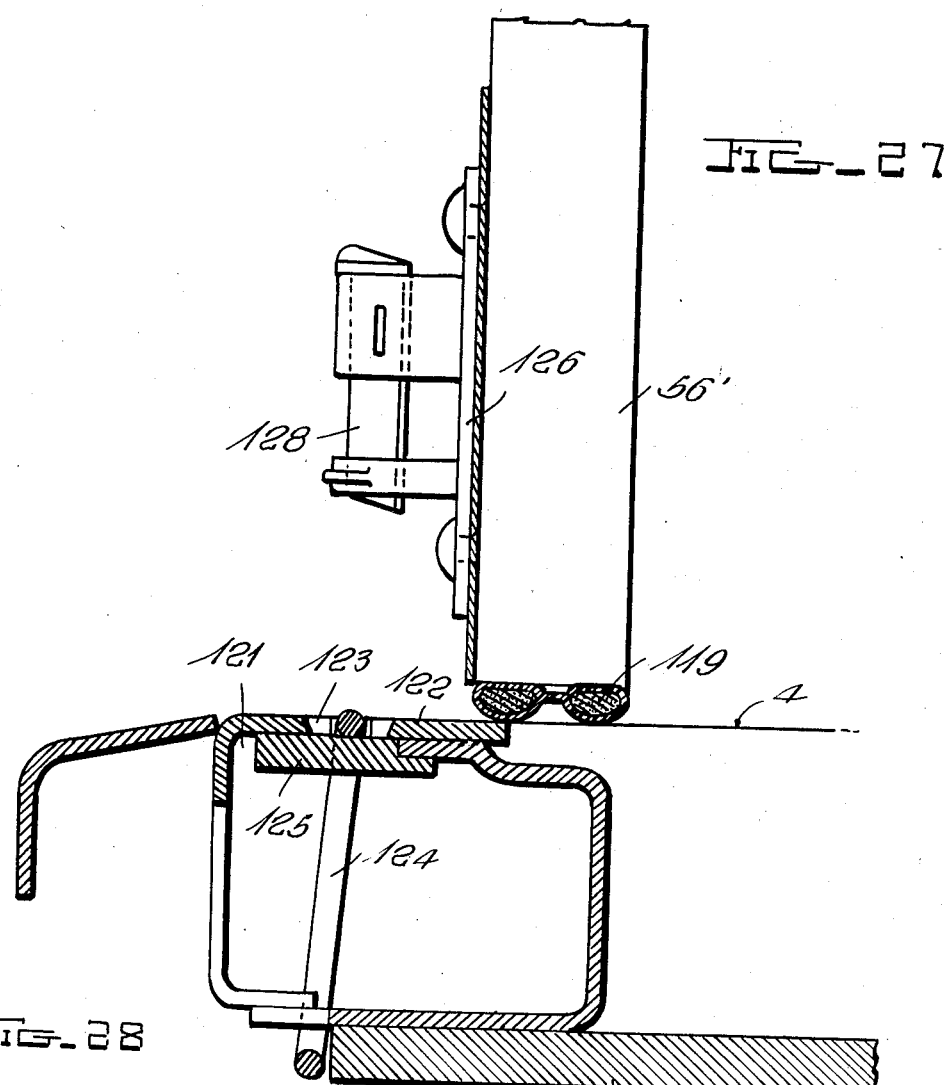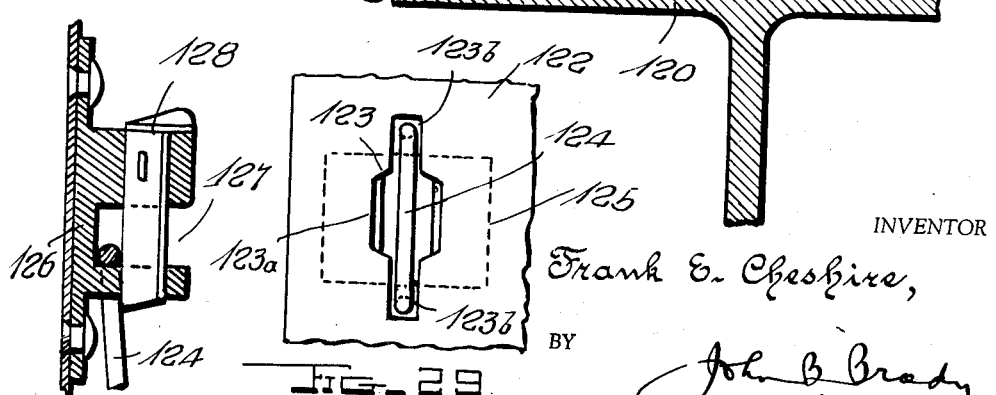

June 28, 1960  F. E. CHESHIRE  2,942,561
UNIT LOAD FREIGHT CAR
Filed Nov. 1, 1956  12 Sheets-Sheet 10
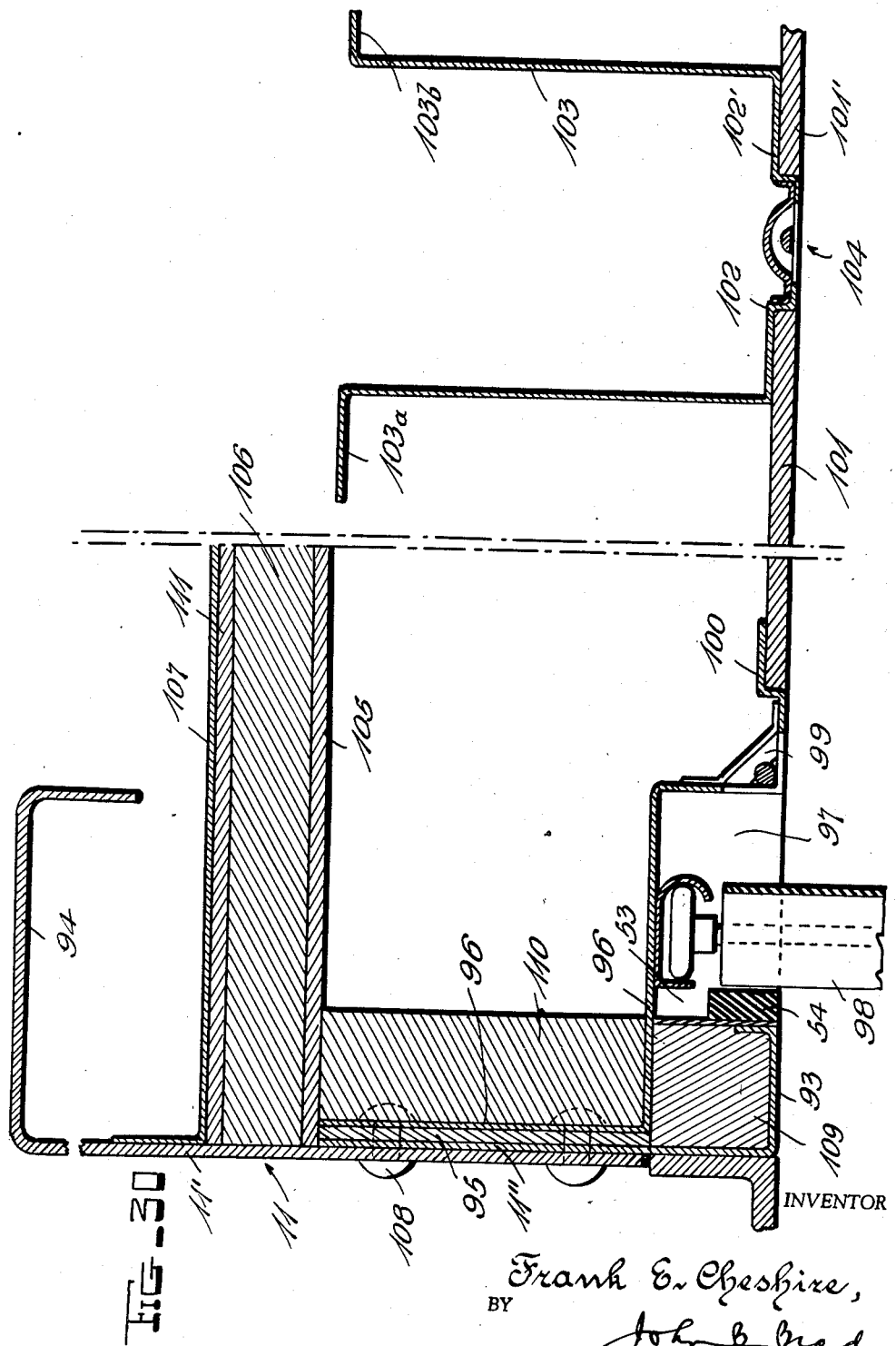
INVENTOR
Frank E. Cheshire,
BY
John B. Brady
ATTORNEY

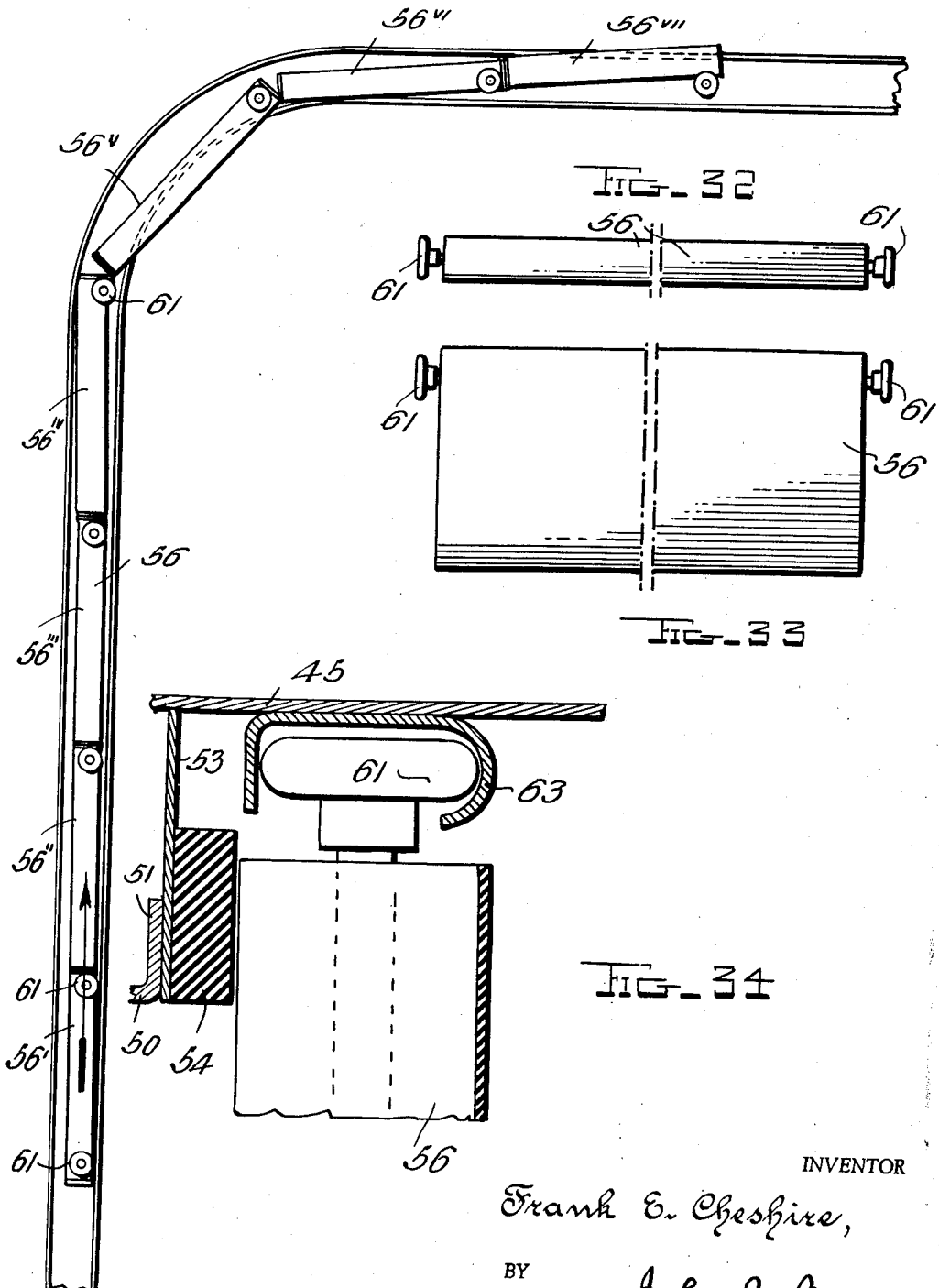

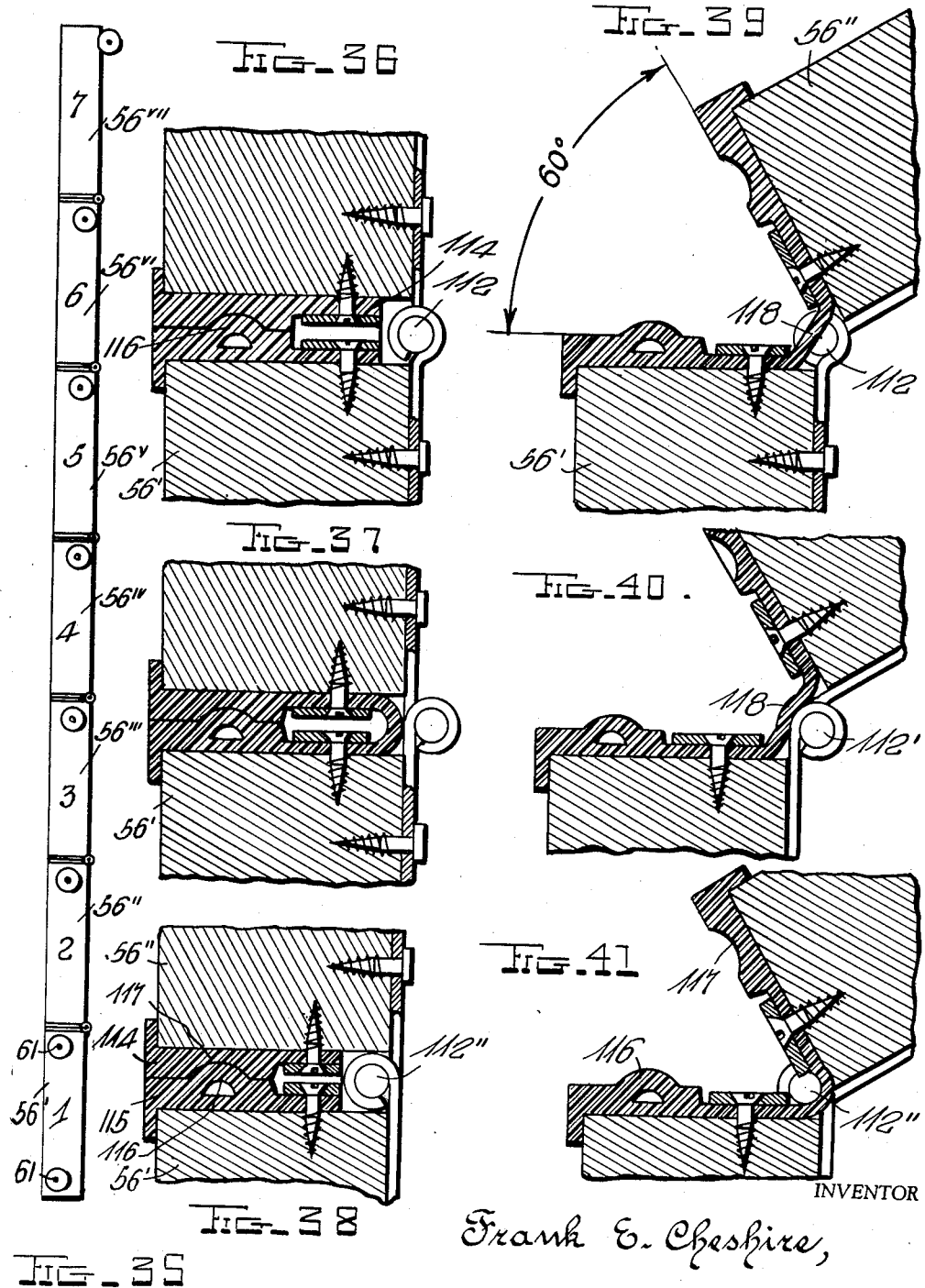

United States Patent Office 2,942,561
Patented June 28, 1960

2,942,561

UNIT LOAD FREIGHT CAR

Frank E. Cheshire, Evansville, Ind., assignor to International Steel Company, Evansville, Ind., a corporation of Indiana Filed Nov. 1, 1956, Ser. No. 619,734

11 Claims. (Cl. 105—404)

My invention relates broadly to freight cars and more particularly to a compartment type freight car by which economic advantages accrue to shippers by the shipment of consignments at substantially car rates.

One of the objects of my invention is to provide a construction of compartment type freight car which is substantially braced throughout the compartment structure insuring protection to lading and long life to the rolling stock.

Another object of my invention is to provide a construction of partition for dividing a freight car into compartment sections, the partitions including provision for fastening lading bands in position for securing the lading against displacement.

Another object of my invention is to provide a compartment freight car structure which is substantially braced at each side thereof by channel members which extend vertically of the sides of the freight car and are so connected with the frame structure of the freight car as to offer substantial resistance to transverse stresses imposed upon the car structure.

Still another object of my invention is to provide a compartment structure of freight car in which opposite sides of the freight car compartments are closed by roll-type doors having special fastening means for securing the doors in closed position.

Other and further objects of my invention reside in the construction and assembly of a unit load freight car as set forth more fully in the specification hereinafter following by reference to the accompany drawings, in which:

Fig. 1 is a perspective view of the unit load freight car of my invention showing two of the compartments open, and three of the compartments closed by roll-type doors;

Fig. 2 is an elevational view showing one of the bracing partitions used in the unit load car structure of my invention;

Fig. 3 is a transverse sectional view taken through one of the partitions in the car structure of my invention, the view being laterally foreshortened for the purpose of illustrating the structure on a larger scale;

Fig. 4 is a horizontal section showing a fragmentary portion of one of the partitions on an enlarged scale, the view illustrating the arrangement of the channel at one side of the car, the guideway for the roll-type door, and the arrangement of the anchor strap securing means in the corners of the partition;

Fig. 5 is a transverse sectional view on an enlarged scale taken through an intermediate portion of the partition and illustrating the lading anchor strap means on an enlarged scale;

Fig. 6 is an elevational view looking at the channel on one side of the freight car;

Fig. 7 is a vertical sectional view through the partition taken substantially on line 7—7 of Fig. 2;

Fig. 8 is a fragmentary horizontal sectional view on an enlarged scale taken on line 8—8 of Fig. 2 and illustrating the arrangement of the lading anchor strap means intermediate the side of the partition;

Fig. 9 is a fragmentary elevational view of the lading anchor strap means shown in Fig. 8;

Fig. 10 is a fragmentary vertical sectional view taken substantially on line 10—10 of Fig. 8;

Fig. 11 is a fragmentary perspective view of the half round bar which is combined with a slotted channel in forming the lading anchor strap means at the intermediate portion of the partition illustrated in Figs. 2–10;

Fig. 12 is a fragmentary perspective view of the slotted channel used in the lading anchor strap means centrally of the partition;

Fig. 13 is an enlarged fragmentary elevational view of the intermediate portion of the partition showing the manner in which the channel projects from the plane of the partition to facilitate insertion of the fastening of the lading straps;

Fig. 14 is a fragmentary perspective view of the closing strip at the rear of the anchor strap fastening means;

Fig. 15 is a perspective view of one of the semicircular strips associated with the closing strip of Fig. 14;

Fig. 16 is a side elevational view of the freight car showing particularly the reinforcement imparted thereto by the vertically extending channels, the view being longitudinally foreshortened in order that the arrangement of the reinforcing channels may be illustrated on a larger scale;

Fig. 17 is a horizontal sectional view through the freight car with the transverse partitions omitted and illustrating the arrangement of the vertical structural members at each corner of the freight car frame and the channels distributed along the freight car frame for bracing the freight car against lateral stresses;

Fig. 18 is a view similar to the view shown in Fig. 17, but illustrating the added rigidity which is imparted to the compartmented freight car by the construction of the transverse partitions;

Fig. 19 is a top plan view of the freight car of my invention;

Fig. 20 is a front elevational view of the fastening means for the roll-type door at each side of the car, the view illustrating the fastening means about to be engaged;

Fig. 21 is a vertical sectional view taken on line 21—21 of Fig. 20;

Fig. 22 is a view similar to the view illustrated in Fig. 20 and showing the fastening means engaged;

Fig. 23 shows an intermediate position of the fastening means in the process of effecting engagement thereof;

Fig. 24 is a horizontal sectional view taken substantially on line 24—24 of Fig. 20;

Fig. 25 is an enlarged vertical sectional view through the fastening hasp taken substantially on line 25—25 of Fig. 22;

Fig. 26 is an enlarged vertical sectional view taken substantially on line 26—26 of Fig. 22;

Fig. 27 is a detail view of the bumper on the lower section of the door and the relationship thereof to the door sill as the door is moved to closed position;

Fig. 28 is a fragmentary vertical sectional view of the hasp lock shown in Fig. 27;

Fig. 29 is a fragmentary horizontal sectional view taken substantially on line 29—29 of Fig. 27 illustrating the hasp partially raised preparatory to being moved into locking position;

Fig. 30 is a fragmentary horizontal sectional view showing a modified construction of car end on an enlarged scale and illustrating particularly the sealing means for one of the door sections;

Fig. 31 is a fragmentary end elevational view of the multiple section door and showing a modified form of guide means for guiding the sections of the door to open and closed position;

Fig. 32 is a top plan view of one of the door sections, the view being foreshortened in order to illustrate the door section on a reasonably large scale;

Fig. 33 is a front elevational view of the door section shown in Fig. 32, the view being foreshortened in a manner similar to that of Fig. 32;

Fig. 34 is an enlarged fragmentary horizontal sectional view on an enlarged scale similar to the views shown in Figs. 3, 4 and 30 for guiding the door sections to open and closed position;

Fig. 35 is an end elevational view of the multiple section door illustrating particularly the variation in the position of the guide rollers on the multiple sections of the door to insure the precision raising and lowering of the doors at opposite sides of the freight car; and Figs. 36-41 show cross sectional views of the hinged connections used between the several door sections showing particularly the offset relationship of the hinge pintles for the different sections and the weather-stripping provided to render certain of the exposed joints weather-tight at different positions along the length of the door.

The conception of the unit load freight car has evolved on the premises, one, of reducing the effort and cost of loading, stowing, and discharging all manner of packaged, piece, unitized and palletized commodities. Further accomplishment is the permitted great utilization of freight cars by the reduction in tension time for loading and discharging or unloading lading. The unit load conception of freight car extends the inherent transport advantages, inherent to the widely developed and accepted use of Ford trucks and lift trucks for all manner of commodity handling. It provides the essential link between processer or manufacturer; warehouse handling; distributor operations and the final placement for retail distribution. A second premise is a marked reduction in the requirement of special dunnage and securing of the lading after placement within the cars. A third premise upon which this unique development has progressed is the practical elimination of wide spread lading damage in transport. The great individual unit carrying capacity of the freight car as compared with other agencies of land transport is thus made readily available for the more economic transportation of all products of agriculture industry.

Materials used in the construction of the unit load freight car have been particularly selected and fabricated to afford the maximum protection to all manner of lading; not only in impact and vibrational damage but providing moisture-proof, corrosion-proof and vermin-proof enclosures. The unit load concept of freight car likewise affords economies in transport by making more practically available the transport of mixed car loads at the car load rate. This advantage is extended not only to shipments of various commodities by an individual shipper to a single destination, but affords like transportation economy to more than one shipper and to more than one destination. The transit privileges so long written into the tariffs, for railroad transport, are thus made practically available as no other transport vehicle can provide.

While I have disclosed compartments of uniform dimensions it will be realized that these compartments may vary in size to accommodate different classes of merchandise and that this car may be provided with compartments varying in dimensions. Such further conception will provide the advantage of unit loading to fit varying dimensions of a multiplicity of products in the agriculture industry. Each compartment after loading is individually sealed and is under control of the consignee-consignor.

My invention is directed to a novel construction of unit load freight car having compartments extending transversely of the car and accessible from either side of the car for purposes of loading, stowage, and unloading. By reason of the large transverse compartments in the car a very special construction is required to reinforce the car against lateral and longitudinal stresses. For this purpose I provide a special form of underframe and car body construction where there are a multiplicity of vertically extending channels disposed in alignment at each side of the car with their flanges extending outwardly for resisting both lateral and longitudinal stresses.

The vertically extending structural dimensions at each corner of the car and the vertically extending channels are horizontally connected adjacent their upper and lower termini and by the conjoint action thereof resist the lateral and longitudinal stresses to which the car frame may be subjected. Laterally extending partitions of fabricated sections extend between aligned vertically extending channels at opposite sides of the car structure. These partitions are constructed to provide guideways which receive tracks in which the vertically movable doors roll. The partitions provide lading anchors for lading anchor straps at different levels and in spaced positions along the partitions. The partitions are constructed to provide flush plane surfaces by sectional panels which fit within recesses formed in the structural members constituting the partition. Each anchor built into the partition is completely sealed-off interiorly of the partition preventing entry of dirt or other accumulation to the interior of the partition.

Special provision is made for latching the roll-type doors in closed position. The closure-opener locking arrangement serves a triple function as indicated. It provides for mechanically exerting a closing pressure particularly on the bottom door seal concurrently facilitating closure of the door against the frictional drag of vertical seals. In the reverse operation of opening the door it facilitates the release of this same frictional drag inherent in the effective conception of sealing and stabilizing the doors; the third function provides a very readily accessible and effective seal pin and link arrangement provided for the use of the railroad car seal so long in use by the railroads of this Continent.

Referring to the drawings in more detail reference character 1 designates the underframe of the freight car having trucks 2 and 3 and floor 4. The freight car is divided into compartments 5, 6, 7, 8 and 9 which may be open from either or both sides, as shown more particularly in Figs. 1, 16 and 18. The freight car is constructed with reinforcing corner plates as shown at 11, 12, 13 and 14 in Figs. 17, 18 and 19, the plates having structural transverse rigidity by reason of the contour thereof as shown more particularly in Figs. 3 and 30.

Because of the fact that the compartment freight car of my invention is substantially open at both sides there is a considerable reduction in the sustaining power of the freight car body, i.e., there are no continuous steel sides. To insure the proper bracing of the car I provide a multiplicity of vertically extending flanged members shown at 16, 17, 18 and 19 at one side of the freight car and at the other side of the freight car I provide flanged members 20, 21, 22 and 23. These flanged members are selected of such section as to impart transverse rigidity to the freight car, i.e., the structural members may be channels with their webs extending in the plane of the side of the freight car and their flanges projecting normal thereto outwardly from the freight car body. The flanges of the channels thus impart transverse rigidity to the freight car body. The lower ends of the vertically extending channels are connected to the sides of the underframe 1 shown at 24. To provide support for the structural members I provide shelf-like brackets on the sides of the underframe as represented at 25 to provide horizontal seats upon which the vertically extending structural members are supported in erect positions. The upper ends of the vertically extending members are interconnected by longitudinally extending structural members represented, for example, in Fig. 16 at 26. The structural members form part of the support for the roof structure 27 of the freight car. Thus it will be seen that the structural members 16—19 at one side of the freight car and the structural members 20—23 at the other side of the freight car are secured at opposite ends in a manner insuring substantial rigidity for the freight car structure irrespective of the fact that the major portion of the freight car may be substantially open along transverse sections of the freight car. While I have illustrated channels as constituting the structural members 16—23 I may employ I-beams or fabricated structural sections constituted by built up plates and angles assembled to impart transverse rigidity to the car body.

The roof structure 27 is supported by the structural members 26 and lateral associated structural members and forms a support for the walkway 28 and the associated extensions thereof shown at 29 and 30. The corner plates 11, 12, 13 and 14 serve as mounting means for the ladders represented conventionally at 31, 32, 33 and 34. I may also provide auxiliary ladders on the car ends as represented at 35 and 36 as shown more particularly in Fig. 19.

In order to insure further substantial rigidity to the freight car structure and to provide for the compartment arrangement for the car I provide transverse partitions extending laterally of the car as represented at 37, 38, 39 and 40 in Fig. 18. The partitions are fabricated structural assemblies each arranged to present a substantially smooth wall for the loading and unloading of the lading. In addition to the transverse partitions, each end of the car is constructed to provide substantial rigidity for the car body. The end sections are shown in Fig. 18 at 41 and 42. These end sections extend between the corner posts shown at 11 and 14 are the corner posts shown at 12 and 13 in Fig. 18 and are displaced from the extreme ends of these posts to provide sufficient space at each end of the freight car for the installation of auxiliary equipment such as refrigeration means and other equipment which may be mounted within the opposite ends of the car represented at 43 and 44 in Fig. 18.

The structure of the partitions 37—40 is shown more clearly in Figs. 2, 4, 5 and 7–15. The partition 39 in Fig. 18 will be considered as typical of the several partitions and consists of the pressed steel members 45 and 46 connected by rivets 47 to the vertically disposed flanged members 18 and 22 through a pair of members represented in Fig. 4 at 48 and 49. The member 49 comprises a vertically extending channel with its web extending adjacent the back of the web of the structure member 18 and with its side flanges 50 extending inwardly into the car and turned inwardly toward each other as shown at 51 to inclose the filler 52. Member 49 forms a connecting means for connecting the associated partition with the flanged members 18 and 22 and is narrower in width than either the associated vertically disposed flanged member or the associated partition. The member 48 is a vertically disposed plate which reinforces the partition transversely of the car. The inwardly turned edges 51 support vertically disposed plates 53 which carry the sealing strips 54 and 55 which provide a tight seal for the roll-up sectional doors represented in Fig. 4 at 56 and 57. The roll-up doors 56 and 57 which close adjacent compartments 8 and 7 are disclosed more fully in Figs. 27–41. The pressed steel member 45 provides vertically extending recesses 58 and 59 within which the roll-up sectional doors 56 and 57 operate and are guided by rollers represented at 60 and 61 which are guided by confining trackways 62 and 63 enabling the sectional doors to be moved to an overhead position as represented more clearly in Fig. 31 when the door entries are to be opened and the sectional doors stowed overhead below the roof structure of the car.

The pressed steel member 45 extends outwardly in a symmetrical arrangement at each side thereof as represented in Fig. 4 and is turned transversely of the car at the opposite sides shown at 64 and 65. The opposite sides 64 and 65 are recessed as shown at 66 and 67 forming a part of a frame which recesses the panel sections 68 and 69 insuring a smooth plane wall for the partition transversely of the car and at the same time increasing the rigidity of the partition. The opposite ends of each partition are symmetrical and similar to the end structure illustrated in Fig. 4.

In order to provide for fastening means for lading I provide a multiplicity of spaced apertures 70 in the corners of the pressed steel member 45 intermediate the recess 58 and the face of the side 64 at one side of the partition and intermediate the recess 59 and the face 65 at the other side of the partition. These apertures or slots 70 enable a lading strap to be threaded through the aperture or slot and around a rod member 71 which extends longitudinally of each corner portion of the pressed steel member 45 and is welded therein. Each corner section of the pressed steel member 45 is reinforced by a plate 72 which forms a backing plate behind each aperture or slot 70 for guiding a lading band around the rod 71 while eliminating any projections into the path of the lading in the car compartment. The rod 71 is secured behind the corner portion of the pressed steel member 45 by strap members 73 shown more clearly in Fig. 10. As noted hereinbefore, the provision for anchoring lading strips to the other end of the partition adjacent the opposite side of the car, symmetrical in structure with the construction I have described in connection with the apertures or slots 70 and rod 71. I have indicated this in Fig. 2 by primed reference characters designating the apertures or slots at 70′ and the vertically extending rod behind the apertures or slots at 71′. Thus the lading may be fastened by the use of anchoring bands at either opening on the opposite sides of the freight car. At the intermediate position of the partition, however, the means for anchoring the lading strips is constructed in a different manner as represented in Figs. 2, 5, 8, 9 and 11–15. At the central position of the partition there are vertically disposed framing members 74 and 75 which are shown in Figs. 2, 5, 8 and 9. These framing members are channel-shaped and are coplanar with the recessed sides and have their flanges coplanar with the recessed ends 66 and 67 of the pressed steel member 45. Intermediate the rear of the webs of the framing members 74 and 75 I provide a fabricated steel section consisting of channels 76 and 77. The channels have their flanges directed toward each other and have their webs projecting outwardly into the plane of the partition. The channels 76 and 77, have their webs slotted 76a and 77a at spaced intervals. Semicircular section rods 78 and 79 extend longitudinally of the rear of the channels 76 and 77 and pass the spaced slots 76a and 77a. A substantially semi-cylindrical plate is provided in the rear of the rods 78 and 79 behind the apertures or slots 76a and 77a as represented at 80 and 81 and provide means for guiding a lading band around the rods 78 and 79. The rods 78 and 79 are secured adjacent the top and bottom of the apertures or slots 76a and 77a by means of straps 82 and 83 shown more clearly in Figs. 9, 13 and 15 and adjacent opposite edges of the backing plates 80 and 81. Thus a lading band may be inserted through the apertures or slots 76a and 77a and guided around the rods 78 and 79 by the backing plates 80 and 81. As represented in Figs. 5 and 18, the apertures or slots 76a and 77a provide entry spaces for the fastening bands which are coplanar with the sides of the partition and do not project therefrom to form an obstruction to the movement of the lading through the partition. This is made possible because by the coaction of the flanges of the channels 74 and 75 as shown in Fig. 5 recesses designated at 84, 85, 86 and 87 are provided into which the panel sections 68 and 69 fit and into which the adjacent panel sections 88 and 89 extend thus forming a completely smooth wall without obstruction at each side of the partitions. It will be understood that the panel sections are removed in the section shown in Fig. 2 but that the framing members are arranged to receive the panel sections to form the smooth wall partition. This is assured by reason of the construction of the top and bottom transverse steel sections 90 and 91 which extend between the pressed steel members 45 and 46 as shown in Fig. 2. The intermediate steel section 92 shown in Fig. 2 further insures the bracing of the partition and provides for the recessed frames into which the panels forming the partition are inserted and fastened in position.

The ends of the freight car are braced by transverse structural assemblies illustrated in Figs. 3, 18 and 30 and comprise as shown in Figs. 3 and 30 the corner plates 11 and 14. In the arrangement shown in Fig. 3, the corner plates 11 and 14 are formed by sections which are rolled to provide channel-shaped parts 93 and 94; and 93' and 94' directed toward each other with intermediate webs 11a and 14a therebetween forming part of the side wall of the freight car. The intermediate webs 11a and 14a are connected to vertically extending side plates 95 and 95' to which there is also connected the framing members 96 and 96' for the end partition. These framing members 96 and 96' are each provided with recessed portions 97 and 97' forming the vertically movable guides for the doors indicated at 98 and 98'. These framing members 96 and 96' are also provided with corner sections forming lading strap anchors 99 and 99' similar to the construction illustrated in Fig. 10. The framing members 96 and 96' are recessed as represented at 100 and 100' to receive the insertable panel sections 101 and 101'.

The inner edges of the panel sections 101 and 101' are mounted in framing recesses indicated at 102 and 102' in the web of the vertically extending channel 103. The vertically extending channel 103 has its rear web slotted at spaced intervals in a manner similar to a structure shown in Figs. 8, 9 and 11–15 to provide the lading strap anchor 104 in an intermediate portion of the end wall.

The vertically extending plates 95 and 95' form abutment stops against which the opposite ends of the rear wall 105 is positioned. The intermediate portion of rear wall 105 is supported against the oppositely directed webs 103a and 103b of the vertically extending channel 103. A filler plate 106 is arranged adjacent rear wall 105 and an end plate 107 is supported adjacent the filler plate 106 constituting the end of the freight car.

In Fig. 30 I have shown a modified construction of corner plate where the corner plate 11 instead of being integral is divided into two parts indicated at 11' and 11". These divided sections of the corner plate include the channels explained in connection with the arrangement shown in Fig. 3, that is, section 11' terminates in the channel 94 while section 11" terminates in the channel 93. These channels are interconnected by rivets 108 which extend through the vertical plate 95 and the framing member 96 in a manner similar to the arrangement shown in Fig. 3. Fillers 109 and 110 are provided to strengthen the corner plate. The remainder of the structure is similar to that described in connection with Fig. 3 except that the end of the car is further reinforced by a filler plate 111 intermediate the filler plate 106 and the end plate 107. The intermediate channel 103 is arranged in a manner similar to that described in Fig. 3.

In order to insure the precision of operation of the doors at each side of the unit-load car provision is made for mounting the adjacent sections of the door on hinges having pintles displaced in different positions between successive sections as represented for example in Figs. 36–38. It will be noted that the adjacent door sections 56 represented in Fig. 35 by reference characters 56', 56", 56''', 56IV, 56V, 56VI, and 56VII have the guide rollers generally indicated at 61 disposed on transversely offset centers with respect to each other. The lower section 56' is the only section that contains two guide rollers 61. All of the other sections contain a single guide roller adjacent the top thereof for coacting with the trackway arranged within the recessed portions 97 and 97' of the framing members 96 and 96' for example. The hinges between the sections 56' and 56" for example have pintles arranged on different axes. That is to say in Fig. 36 the hinge pintle between the door sections is represented at 112 in a plane substantially coplanar with the inside faces of the door sections whereas in Fig. 37 the hinge pintle 112' is shown offset inwardly from the planes of the inside surfaces of the door sections in a direction toward the interior of the freight car compartment. Whereas, in Fig. 38 the hinge pintle shown at 112" is offset outwardly from the freight car compartment but within the adjacent door sections. This insures the proper movement of the door sections relative to each other as the doors are raised and lowered at opposite sides of the freight car compartments. To insure the moistureproof and fungusproof condition of the seal provided by the movable door, I provide a variety of different arrangements of coacting rubber gaskets as represented in Figs. 36–41. For example, live rubber sealing strips 114 and 115 may be fastened to adjacent edges of the door sections 56' and 56" as shown in Figs. 36 and 38 with a longitudinally extending bead 116 on strip 115 fitting into a longitudinal recess 117 in sealing strip 114. When the door sections are moved to a vertical position for closing the compartment, a tight moistureproof seal is established between the door sections by the projection of bead 116 into recess 117 as illustrated in Figs. 36–41. In Fig. 37 the material of the sealing strips is joined as indicated at 118. This joint may be located wholly within the confines of the door sections as represented in Figs. 37, 39, and 40 providing a seal adjacent the pintle 112 between the door sections or the sealing material may be carried around the position of the pintle 112" as represented in Fig. 41. Either construction insures a tight moistureproof seal between the door sections. All of the sealing joints permit the movement of the door sections with respect to each other while maintaining the tight seal therebetween as illustrated in Figs. 39, 40, and 41.

In order to insure a tight seal at the bottom of the door and with respect to the floor 4 of the freight car, I provide a double cushion seal shown at 119 in Fig. 27 extending longitudinally of the bottom peripheral edge of door section 57' and abutting with the floor 4 adjacent the opening through the compartment for insuring a tight moistureproof seal beneath the door.

In order to insure the maintenance fo the seal at the bottom of each of the doors, I provide the arrangement shown in Figs. 20–29 wherein reference character 120 designates the side sill of the underframe over which the side structure or gusset of the car body indicated at 121 is supported. The plate 122 of the side structure or gusset 121 is apertured in alignment with the centers with each of the roll-up doors as represented at 123 including a central finger access portion 123a and end portions 123b to accommodate a lock staple 124 which may be raised from the position illustrated in Fig. 27 around the reinforcement plate 125 to a position engageable with the hasp 126 carried by the bottom door section 56'. The hasp 126 is provided with a horizontal extending opening 127 into which the top of the lock staple 124 is adapted to be engaged when the door is in the lowermost position illustrated in Fig. 27. A vertically slidable lock pin 128 is provided in the hasp 126 for slidable engagement with the parts of the hasp for locking the top of the lock staple in confined position as illustrated in Fig. 28. Figs. 1, 20, 22, and 25 indicate the position of the lock staple 124 when the lowermost section of the door 56' is in locked position. In order to more readily manipulate the vertically movable doors into locking position, I provide the mechanism illustrated in Figs. 1, 20–24, and 26 for each of the vertically movable doors. This mechanism is mounted on the plate 129 which supports the hasp 126 and consists of an outwardly projecting pivot pin 130 on which there is journaled the hand lever 131. The pivot pin 130 is supported at its outer end in plate 132 which is fastened to plate 129 through members 133. One end of the hand lever 131 is pivotally connected at 134 to the latching member 135 which depends downwardly and is provided with an engaging hook 136 on the lower end thereof. The latching member 135 may gravitate through the opening 137 in the side structure or gusset 121 adjacent the transverse bar 138 so that when the latching member 135 is shifted angularly the hook 136 may engage beneath the bar 138. Downward movement on the hand lever 131 thus forces the movable door downwardly until the lowermost section 56' and the double cushion 119 thereon contacts the car floor 4 establishing a tight seal beneath the door. The downward pressure applied to the hand lever 131 enables the door to be moved downwardly to a position in which the lock staple 124 may be readily inserted between the jaws of the hasp 126 for locking the door in its lowered position. Conversely, when the door must be opened pressure applied downwardly on hand lever 131 enables double seal 119 to be compressed providing that slight amount of play necessary to enable the lock staple 124 to be removed from the jaws of the hasp 126 upon withdrawal of the pin 128. Thus, the hand lever 131 may be manipulated both in the closing and the opening of the doors.

After the commodities are packed in the respective compartments and the commodities fastened therein by use of the lading bands fastened through the secured means 70, 78, 79, 99, 104, etc., and the doors to the compartment closed and locked, the compartment need not be opened until the car reaches the destination. This time the compartment may be opened and conveniently unloaded with minimum labor moving the lading in either direction transversely from the compartment. Loading of the compartments is very greatly facilitated by access to the compartments from either side thereof.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A freight car comprising an underframe, side sills forming part of said underframe, an end section extending transversely of the freight car located at each end of the freight car and connected with the ends of said underframe and extending vertically above the underframe, corner plates secured to said underframe and extending vertically from said side sills adjacent the ends thereof, a floor structure carried by said underframe and extending adjacent said end sections, longitudinally extending structural members spaced above the underframe and secured to the upper ends of said sections and said corner plates and supported by said end sections and said corner plates, pairs of transversely aligned vertically disposed flanged members spaced along the longitudinal extent of said side sills and extending vertically in substantially coplanar relation to the exterior sides of said side sills, with the lower portions of said flanged members secured to said side sills and connected at their upper portions with said longitudinally extending structural members, a roof structure secured to said longitudinally extending structural members and said end sections, said vertically disposed flanged members each including outwardly projecting flanges for imparting rigidity to the freight car, and lateral partitions connected at opposite ends with said transversely aligned vertically disposed flanged members for dividing the freight car into a plurality of transversely disposed compartments extending laterally of the freight car and accessible through either side of the freight car.

2. A freight car as set forth in claim 1 in which said vertically disposed flanged members are channels each including a central web and flanges at opposite longitudinally extending edges thereof and wherein said webs are connected to the sides of said longitudinally extending structural members adjacent the upper portions thereof and to the exterior sides of said side sills adjacent said floor structure, and wherein said flanges project outwardly normal to the planes of said web for resisting stresses both laterally and longitudinally of the freight car.

3. A freight car as set forth in claim 1 in which horizontally projecting brackets are disposed on the opposite exterior sides of the side sills in positions beneath said vertically disposed flanged members and constitute seats for supporting the lower ends of the vertically disposed flanged members in vertically erect positions.

4. A freight car as set forth in claim 1 in which said partitions are fabricated sections each including frames for supporting a plurality of panel sections, each of said panel sections extending in coplanar surfaces laterally of the partitions defining said compartments transversely of the freight car.

5. A freight car as set forth in claim 1 in which said vertically disposed flanged members are constituted by channels each having a central web and peripheral flanges at opposite lineally extending edges with said flanges projecting outwardly from the freight car, and wherein said lateral partitions terminate at each end thereof in channel members each having an intermediate web and vertically disposed lineally extending side flanges, and connecting means interconnecting the rear of the central web of said channels constituting said vertically disposed flanged members with the rear of the intermediate webs of the channel members at the ends of said partitions symmetrically at each end of said partitions.

6. A freight car as set forth in claim 1 in which said vertically disposed flanged members are channels each having a central web and peripheral flanges at opposite vertically extending edges of said webs, with said flanges projecting outwardly from the freight car, said lateral partitions terminating at each end thereof in channel members each having an intermediate web and vertically extending side flanges, and connecting means interconnecting the rear of the central web of said vertically disposed flanged members with the rear of the intermediate webs of the channel members at the opposite ends of said partitions, a vertically disposed fabricated section disposed between said channel members and the ends of said partitions, said fabricated sections having spaced parallel wall portions extending in planes that are substantially parallel with the planes of the peripheral flanges of said flanged members and the flanges of said channel members.

7. A freight car as set forth in claim 1 in which said vertically disposed flanged members are channels each having a web and flanges at opposite vertically extending edges thereof with said flanges projecting outwardly on opposite sides of the freight car, and wherein said lateral partitions each includes an end portion of reduced section, the ends of said reduced sections terminating in channel members each having a rear web and vertically disposed side flanges and means fastening said last mentioned channel members in web-to-web relation to said first mentioned channels with the flanges of said channel members turned inwardly toward each other, and filler means disposed between the reduced section of said partitions and the inwardly turned ends of said channel members, said fastening means extending in central alignment with said partitions, the flanges of said channels, and the flanges of said channel members.

8. A freight car as set forth in claim 1 in which said vertically disposed flanged members are channels each having a web and flanges at opposite vertically extending edges thereof with said flanges projecting outwardly from the opposite sides of the freight car, vertically extending fabricated sections connected with opposite ends of said lateral partitions, each of said sections having a channel member on the terminating end thereof, where said last mentioned channel members have a rear web and vertically extending side flanges, means securing the webs of said channel members in web-to-web relation to said channels with the side flanges of said channel members extending inwardly toward each other, said fabricated sections each including a vertically disposed guide rail adjacent the opposite ends of said partitions, said securing means having a width substantially less than the width of the associated vertically disposed flanged member and the associated channel member of said partition, and filler means disposed between the opposite sides of said fabricated sections and the inturned side flanges of said channel members.

9. A freight car as set forth in claim 1 in which said vertically disposed flanged members are channels each having a web and flanges at opposite vertically extending edges thereof, said flanges projecting outwardly from the opposite sides of the freight car, a vertically disposed channel member having a rear web and vertically disposed side flanges arranged adjacent each of said vertically disposed flanged members, means securing the webs of said channel members in web-to-web relation to the webs of said vertically disposed flanged members with the flanges of said channel members directed inwardly toward each other, vertically extending fabricated channel structures having outer and inner end portions of different widths with said inner end portions connected with the ends of said partitions and extending in transverse alignment with the centers thereof and the outer end portions connected with the webs of said channel members and symmetrically arranged intermediate vertically disposed channel members transversely aligned with the aforesaid channel members for providing a rigid structural surface between the compartments of said freight car.

10. A freight car as set forth in claim 1 in which structural members of channel-like section are connected between said vertically disposed flanged members at each side of the freight car and opposite ends of the associated aligned partitions, and wherein said structural members of channel-like sections include side flanges which are stepped from reduced width portions in the longitudinal direction of the car which are substantially less than the corresponding widths of the associated vertically disposed flanged members to portions having widths substantially conforming with the widths of the associated partitions, and vertically extending doorway guides disposed intermediate the ends of said partitions and said vertically disposed flanged members on the external sides of the reduced width portions of said channel-like sections.

11. A freight car as set forth in claim 1 including connecting means extending between opposite ends of said partitions and said vertically disposed flanged members, said connecting means including portions of reduced transverse section and vertically extending doorway guides formed in said portions of reduced section of said connecting means.

References Cited in the file of this patent

UNITED STATES PATENTS

| | | |
|---|---|---|
| 598,136 | Campbell et al. | Feb. 1, 1898 |
| 1,011,796 | Howard | Dec. 12, 1911 |
| 1,900,711 | Howard | Mar. 7, 1933 |
| 2,021,909 | Brigham | Nov. 26, 1935 |
| 2,082,251 | Madland | June 1, 1937 |
| 2,583,257 | Dietrichson | Jan. 22, 1952 |
| 2,707,652 | Voss | May 3, 1955 |
| 2,730,964 | Garlock | Jan. 17, 1956 |
| 2,733,671 | Sheesley et al. | Feb. 7, 1956 |
| 2,769,405 | Nystrom | Nov. 6, 1956 |
| 2,786,523 | Phillips | Mar. 26, 1957 |